United States Patent
Park et al.

(10) Patent No.: US 11,656,765 B2
(45) Date of Patent: May 23, 2023

(54) DBI CIRCUIT AND MEMORY DEVICE INCLUDING THE SAME

(71) Applicant: SK hynix Inc., Gyeonggi-do (KR)

(72) Inventors: Yong Sang Park, Gyeonggi-do (KR);
Dae Woo Kim, Gyeonggi-do (KR);
Min Soo Lim, Gyeonggi-do (KR);
Young Duke Seo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 19 days.

(21) Appl. No.: 17/353,287

(22) Filed: Jun. 21, 2021

(65) Prior Publication Data

US 2022/0214804 A1 Jul. 7, 2022

(30) Foreign Application Priority Data

Jan. 7, 2021 (KR) .................. 10-2021-0001773

(51) Int. Cl.
*G06F 3/06* (2006.01)

(52) U.S. Cl.
CPC ............ *G06F 3/061* (2013.01); *G06F 3/0655* (2013.01); *G06F 3/0679* (2013.01)

(58) Field of Classification Search
CPC ....... G06F 3/061; G06F 3/0655; G06F 3/0679
See application file for complete search history.

(56) References Cited

U.S. PATENT DOCUMENTS

| | | | | |
|---|---|---|---|---|
| 7,869,525 | B2 | 1/2011 | Macri et al. | |
| 9,635,011 | B1* | 4/2017 | Wu | H04L 63/0807 |
| 2005/0071554 | A1* | 3/2005 | Thayer | G06F 11/1076 |
| | | | | 711/114 |
| 2011/0018747 | A1* | 1/2011 | Shinoda | G06F 13/4018 |
| | | | | 341/100 |
| 2012/0233379 | A1* | 9/2012 | Sawa | G11C 16/10 |
| | | | | 711/E12.001 |
| 2019/0096502 | A1* | 3/2019 | Lu | G11C 29/024 |

FOREIGN PATENT DOCUMENTS

KR 10-2013-0048394 A 5/2013

* cited by examiner

*Primary Examiner* — Nanci N Wong
(74) *Attorney, Agent, or Firm* — IP & T Group LLP

(57) ABSTRACT

A data bus inversion (DBI) circuit of a memory device includes a first processing component configured to generate first combination data by combining read data read from a memory cell region and previous data previously outputted from a data line, and generate second combination data by selectively inverting the first combination data depending on a result of comparing the first combination data and the previous data; and a second processing component configured to generate data to be outputted from the data line, by combining the second combination data and the previous data, wherein the second processing component generates bits of unnecessary bit positions in the data to be the same as bits of the unnecessary bit positions in the previous data.

37 Claims, 5 Drawing Sheets

FIG. 4

| Unnecessary bits (necessary bits) | Reference number | D1 | DQ |
|---|---|---|---|
| None (total 8 bits) | 4 | RD[7:0] | D2[7:0] |
| LSB 1bit (MSB 7bits) | 3 | {RD[7:1], PD[0]} | {D2[7:1], PD[0]} |
| LSB 2bit (MSB 6bits) | 3 | {RD[7:2], PD[1:0]} | {D2[7:2], PD[1:0]} |
| LSB 3bit (MSB 5bits) | 2 | {RD[7:3], PD[2:0]} | {D2[7:3], PD[2:0]} |
| LSB 4bit (MSB 4bits) | 2 | {RD[7:4], PD[3:0]} | {D2[7:4], PD[3:0]} |
| LSB 5bit (MSB 3bits) | 1 | {RD[7:5], PD[4:0]} | {D2[7:5], PD[4:0]} |
| LSB 6bit (MSB 2bits) | 1 | {RD[7:6], PD[5:0]} | {D2[7:6], PD[5:0]} |
| LSB 7bit (MSB 1bits) | 0 | {RD[7], PD[6:0]} | {D2[7], PD[6:0]} |
| Total 8 bits (none) | 0 | PD[7:0] | PD[7:0] |

401

402

DBI CIRCUIT AND MEMORY DEVICE INCLUDING THE SAME

CROSS-REFERENCES TO RELATED APPLICATION

The present application claims priority under 35 U.S.C. § 119(a) to Korean Patent Application Number 10-2021-0001773, filed on Jan. 7, 2021, which is incorporated herein by reference in its entirety.

BACKGROUND

1. Technical Field

Various embodiments of the present disclosure generally relate to a data bus inversion (DBI) circuit, and, more particularly, to a DBI circuit of a memory device.

2. Related Art

A memory device may support a DBI function to efficiently perform a read operation. Through the DBI function, data may be stably transmitted while causing lower power consumption.

A high-bandwidth memory (HBM) may be used in various systems because it provides a high bandwidth with a short latency through low power consumption. The HBM may operate with improved performance through the DBI function.

SUMMARY

Various embodiments of the present disclosure are directed to a DBI circuit and a memory device including the same, capable of minimizing an amount of power consumption.

In an embodiment of the present disclosure, a data bus inversion (DBI) circuit of a memory device may include: a first processing component configured to generate first combination data by combining read data read from a memory cell region and previous data previously outputted from a data line, and generate second combination data by selectively inverting the first combination data depending on a result of comparing the first combination data and the previous data; and a second processing component configured to generate data to be outputted from the data line, by combining the second combination data and the previous data, wherein the second processing component generates bits of unnecessary bit positions in the data to be the same as bits of the unnecessary bit positions in the previous data.

In an embodiment of the present disclosure, a data bus inversion (DBI) circuit of a memory device may include: a first processing component configured to generate first combination data by combining read data read from a memory cell region and previous data previously outputted from a data line, and generate second combination data by selectively inverting the first combination data depending on a result of comparing the first combination data with the previous data; and a second processing component configured to generate data to be outputted from the data line, by combining the second combination data and the previous data, wherein the first processing component generates bits of unnecessary bit positions in the first combination data to be the same as bits of the unnecessary bit positions in the previous data.

In an embodiment of the present disclosure, a data bus inversion (DBI) circuit of a memory device may include: a first processing component configured to generate first combination data by combining read data read from a memory cell region and previous data previously outputted from a data line, determine a reference number based on a partial read signal, and generate second combination data by inverting the first combination data depending on a result of comparing the number of transitions between the first combination data and the previous data with the reference number; and a second processing component configured to generate data to be outputted from the data line, by combining the second combination data and the previous data.

In an embodiment of the present disclosure, a memory device may include: a memory cell region; a data bus inversion (DBI) circuit configured to generate data to be outputted to a controller through a data line, based on read data read from the memory cell region; and a peripheral circuit configured to transmit a partial read signal indicating unnecessary bit positions in the data, to the DBI circuit based on partial read information received from the controller. The DBI circuit includes: a first processing component configured to generate first combination data by combining the read data and previous data, previously outputted to the controller through the data line, based on the partial read signal, and generate second combination data by selectively inverting the first combination data depending on a result of comparing the first combination data with the previous data; and a second processing component configured to generate the data by combining the second combination data and the previous data based on the partial read signal.

In an embodiment of the present disclosure, a memory device may include: a memory device; and a controller coupled to the memory and configured to receive read data from the memory device, use some bits of the read data and transmit, to the memory device, partial read information indicating positions of the some bits. The memory device includes: a memory cell region; and a data bus inversion (DBI) circuit configured to receive, from the memory cell region, data including multiple bits, select a group of bits from among the multiple bits in response to the partial read information, invert the group of bits to generate data including the inverted bits and transmit the data to the controller.

The DBI circuit and the memory device including the same according to the embodiments of the present disclosure may minimize an amount of power consumption.

BRIEF DESCRIPTION OF THE DRAWINGS

FIG. 4 is a table showing a reference number depending on unnecessary bits in data, first combination data and the data in accordance with an embodiment of the present disclosure.

DETAILED DESCRIPTION

Figure 1:
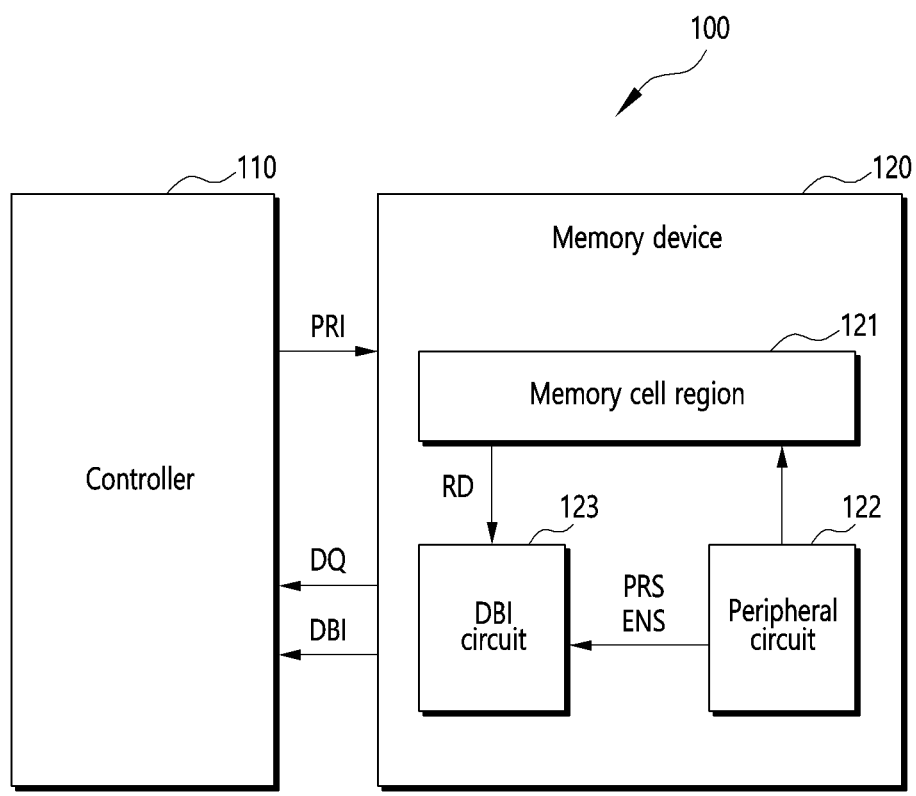
FIG. 1 is a block diagram illustrating a memory system in accordance with an embodiment of the present disclosure.

In the present disclosure, advantages, features and methods for achieving them will become more apparent after a reading of the following embodiments taken in conjunction with the accompanying drawings. The present disclosure may, however, be embodied in different forms and should not be construed as being limited to the embodiments set forth herein. Rather, these embodiments are provided to describe the present disclosure in detail to the extent that a person skilled in the art to which the disclosure pertains can easily carry out the technical ideas of the present disclosure.

It is to be understood herein that embodiments of the present disclosure are not limited to the particulars shown in the drawings and that the drawings are not necessarily to scale and in some instances proportions may have been exaggerated in order to more clearly depict certain features of the disclosure. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a DBI circuit and a memory device including the same will be described in detail with reference to the accompanying drawings through various examples of embodiments.

FIG. 1 is a block diagram illustrating a memory system 100 in accordance with an embodiment of the present disclosure.

Referring to FIG. 1, the memory system 100 may include a controller 110 and a memory device 120.

By controlling the memory device 120, the controller 110 may store data in the memory device 120 and read data from the memory device 120.

The controller 110 may control the memory device 120 such that the memory device 120 operates in a data bus inversion (DBI) mode. For example, although not limited to this example, the controller 110 may set a DBI enable mode register (not illustrated) in a memory such that the memory device 120 operates in the DBI mode.

The DBI mode may be, for example, a mode that may be supported in a high-bandwidth memory (HBM). The DBI mode may be a mode in which, in order to minimize data transition between data DQ to be currently outputted and previous data previously outputted, the memory device 120 outputs original data as the data DQ as it is or outputs data, obtained by inverting original data, as the data DQ. That is, when it is determined that outputting data inverted according to a predetermined DBI algorithm is more efficient than outputting original data as it is, the memory device 120 may output the inverted data.

The memory device 120 may perform a write operation, a read operation and so forth under the control of the controller 110.

The memory device 120 may operate in the DBI mode under the control of the controller 110. When operating in the DBI mode, the memory device 120 may transmit the data DQ and a DBI signal DBI to the controller 110. For example, the DBI signal DBI may indicate, in an enable state, that the data DQ is inverted original data, and may indicate, in a disable state, that the data DQ is original data. Therefore, the controller 110 may restore and use the original data by inverting the data DQ again when the DBI signal DBI is in the enable state, and may use the data DQ as it is when the DBI signal DBI is in the disable state.

The memory device 120 may include a memory cell region 121, a peripheral circuit 122 and a DBI circuit 123.

The memory cell region 121 may be a region for storing data transmitted from the controller 110. The memory cell region 121 may include a plurality of memory cells.

The peripheral circuit 122 may control the memory cell region 121 and the DBI circuit 123 under the control of the controller 110. In detail, the peripheral circuit 122 may control the memory cell region 121 under the control of the controller 110 such that the memory cell region 121 stores data and outputs stored data. The peripheral circuit 122 may control the DBI circuit 123 under the control of the controller 110 such that the DBI circuit 123 processes data, outputted from the memory cell region 121, based on the DBI algorithm.

The DBI circuit 123 may output the data DQ and the DBI signal DBI by processing data, outputted from the memory cell region 121, under the control of the peripheral circuit 122.

The memory device 120 may output the data DQ to the controller 110 by performing a read operation in a predetermined unit (e.g., 8 bits, 16 bits or 32 bits) as designed. In some cases, the controller 110 may use only some of the data DQ of the predetermined unit outputted from the memory device 120. For example, the controller 110 may use only the upper 4 bits including the most significant bit (MSB) among total 8 bits of the data DQ outputted from the memory device 120. Nevertheless, because the memory device 120 outputs the data DQ only in the predetermined unit, the remaining data unnecessary to the controller 110, for example, the lower 4 bits including the least significant bit (LSB) among the total 8 bits of the data DQ, may need to be read and outputted. These unnecessary bits or unused bits may be outputted while causing unnecessary power consumption. However, according to embodiments of the disclosure, power consumption due to unnecessary bits may be minimized.

To this end, first, the controller 110 may provide partial read information PRI to the memory device 120. The partial read information PRI may indicate information on unnecessary bits in the data DQ, for example, positions and/or the number of the unnecessary bits. Alternatively, the partial read information PRI may indicate information on not unnecessary bits but necessary bits in the data DQ, for example, positions and/or the number of the necessary bits.

In order to control the DBI circuit 123, the peripheral circuit 122 may transmit a partial read signal PRS and a DBI enable signal ENS to the DBI circuit 123.

The peripheral circuit 122 may generate the partial read signal PRS based on the partial read information PRI. The peripheral circuit 122 may generate information on unnecessary bits (e.g., positions and/or the number of the unnecessary bits) in the data DQ, as the partial read signal PRS. Alternatively, the peripheral circuit 122 may generate information on necessary bits (e.g., positions and/or the number of the necessary bits) in the data DQ, as the partial read signal PRS.

The peripheral circuit 122 may generate the DBI enable signal ENS depending on whether the DBI mode is set by the controller 110. When the memory device 120 is set to operate in the DBI mode, the peripheral circuit 122 may generate the DBI enable signal ENS in an enable state. When the memory device 120 is not set to operate in the DBI mode, the peripheral circuit 122 may generate the DBI enable signal ENS in a disable state.

Based on the partial read signal PRS, the DBI circuit 123 may generate and output unnecessary bits except necessary bits in the data DQ, in the same manner as bits of the same positions in previous data. The DBI circuit 123 may maximize a DBI effect by applying the DBI algorithm to only the necessary bits in the data DQ. A detailed configuration and operating method of the DBI circuit 123 will be described below in detail.

The memory device 120 may include a volatile memory device and/or a nonvolatile memory device. The volatile memory device may include a DRAM (dynamic random access memory) or an SRAM (static random access memory). The nonvolatile memory device may include a flash memory device such as a NAND flash or a NOR flash, a FeRAM (ferroelectric random access memory), a PCRAM (phase-change random access memory), a MRAM (magnetic random access memory) or a ReRAM (resistive random access memory).

Figure 2:
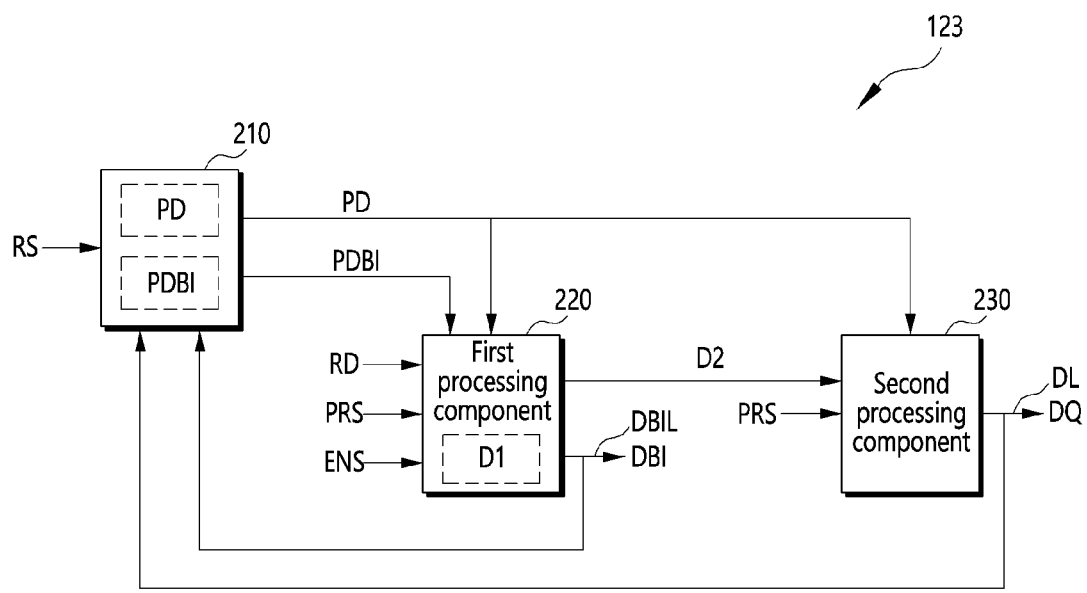
FIG. 2 is a block diagram illustrating a DBI circuit of FIG. 1 in accordance with an embodiment of the present disclosure.

FIG. 2 is a block diagram illustrating the DBI circuit 123 of FIG. 1 in accordance with an embodiment of the present disclosure.

Referring to FIG. 2, the DBI circuit 123 may include a previous data storage 210, a first processing component 220 and a second processing component 230. The first processing component 220, and the second processing component 230 include all circuits, systems, software, firmware and devices necessary for their respective operations and functions.

The previous data storage 210 may be connected to a data line DL through which the data DQ is outputted and a DBI signal line DBIL through which the DBI signal DBI is outputted. The previous data storage 210 may receive the data DQ from the data line DL and the DBI signal DBI from the DBI signal line DBIL, and may store the data DQ and the DBI signal DBI as previous data PD and a previous DBI signal PDBI, respectively. The previous data storage 210 may output the previous data PD and the previous DBI signal PDBI in response to a read signal RS.

The read signal RS may be generated by the peripheral circuit 122 of FIG. 1 in response to a read command inputted from the controller 110.

The first processing component 220 may receive the previous data PD and the previous DBI signal PDBI outputted from the previous data storage 210, read data RD outputted from the memory cell region 121, the partial read signal PRS and the DBI enable signal ENS, and may output second combination data D2 and the DBI signal DBI.

Before describing operations, hereinafter, necessary bit positions mean positions of necessary bits in the data DQ, and unnecessary bit positions mean positions of unnecessary bits in the data DQ.

The first processing component 220 may generate first combination data D1 by combining the previous data PD and the read data RD, and may generate the second combination data D2 by selectively inverting the first combination data D1 depending on a result of comparing the first combination data D1 with the previous data PD.

In detail, the first processing component 220 may generate bits of unnecessary bit positions in the first combination data D1 to be the same as bits of unnecessary bit positions in the previous data PD. The first processing component 220 may generate bits of necessary bit positions in the first combination data D1 to be the same as bits of necessary bit positions in the read data RD. Therefore, the first combination data D1 may include the bits of the necessary bit positions of the read data RD and the bits of the unnecessary bit positions of the previous data PD, as bits of the same positions. The first processing component 220 may identify the unnecessary bit positions and the necessary bit positions based on the partial read signal PRS.

The first processing component 220 may determine a reference number corresponding to the number of necessary bits in the data DQ, may determine the number of transitions by comparing the first combination data D1 and the previous data PD, and may generate the second combination data D2 by selectively inverting the first combination data D1 based on the number of transitions and the reference number.

In detail, the first processing component 220 may determine the reference number corresponding to the number of unnecessary bits or the number of necessary bits in the data DQ, based on the partial read signal PRS. For example, the first processing component 220 may determine, as the reference number, a maximum integer that does not exceed a value obtained by dividing the number of necessary bits in the data DQ by 2.

The first processing component 220 may determine the number of transitions between the first combination data D1 and the previous data PD by bitwise comparing the first combination data D1 and the previous data PD. The number of transitions between the first combination data D1 and the previous data PD may be the number of bits in the first combination data D1 which are different from those in the previous data PD.

The first processing component 220 may determine whether the number of transitions between the first combination data D1 and the previous data PD exceeds the reference number. When the number of transitions exceeds the reference number, the first processing component 220 may generate data, obtained by inverting the first combination data D1, as the second combination data D2. When the number of transitions is less than the reference number, the first processing component 220 may generate the first combination data D1 as the second combination data D2. When the number of transitions is the same as the reference number and the number of necessary bits in the data DQ is odd, the first processing component 220 may generate the first combination data D1 as the second combination data D2. When the number of transitions is the same as the reference number and the number of necessary bits in the data DQ is even, if the previous DBI signal PDBI is in an enable state, the first processing component 220 may generate data, obtained by inverting the first combination data D1, as the second combination data D2. When the number of transitions is the same as the reference number and the number of necessary bits in the data DQ is even, if the previous DBI signal PDBI is in a disable state, the first processing component 220 may generate the first combination data D1 as the second combination data D2.

The first processing component 220 may output the DBI signal DBI in an enable state when outputting inverted data of the first combination data D1 as the second combination data D2, and may output the DBI signal DBI in a disable state when outputting the first combination data D1 as the second combination data D2.

When the DBI enable signal ENS is in an enable state, the first processing component 220 may output the second combination data D2 and the DBI signal DBI by selectively inverting the first combination data D1. When the DBI enable signal ENS is in a disable state, the first processing component 220 may output the first combination data D1 as the second combination data D2 and may output the DBI signal DBI in a disable state.

The second processing component 230 may receive the previous data PD outputted from the previous data storage 210, the second combination data D2 outputted from the first processing component 220 and the partial read signal PRS, and may output the data DQ. The second processing component 230 may generate the data DQ by combining the previous data PD and the second combination data D2.

In detail, the second processing component 230 may generate bits of unnecessary bit positions in the data DQ to be the same as bits of unnecessary bit positions in the previous data PD. The second processing component 230 may generate bits of necessary bit positions in the data DQ to be the same as bits of necessary bit positions in the second combination data D2. Therefore, the data DQ may include the bits of the necessary bit positions of the second combination data D2 and the bits of the unnecessary bit positions of the previous data PD, as bits of the same positions. The second processing component 230 may identify the unnecessary bit positions and the necessary bit positions based on the partial read signal PRS.

Figure 3:
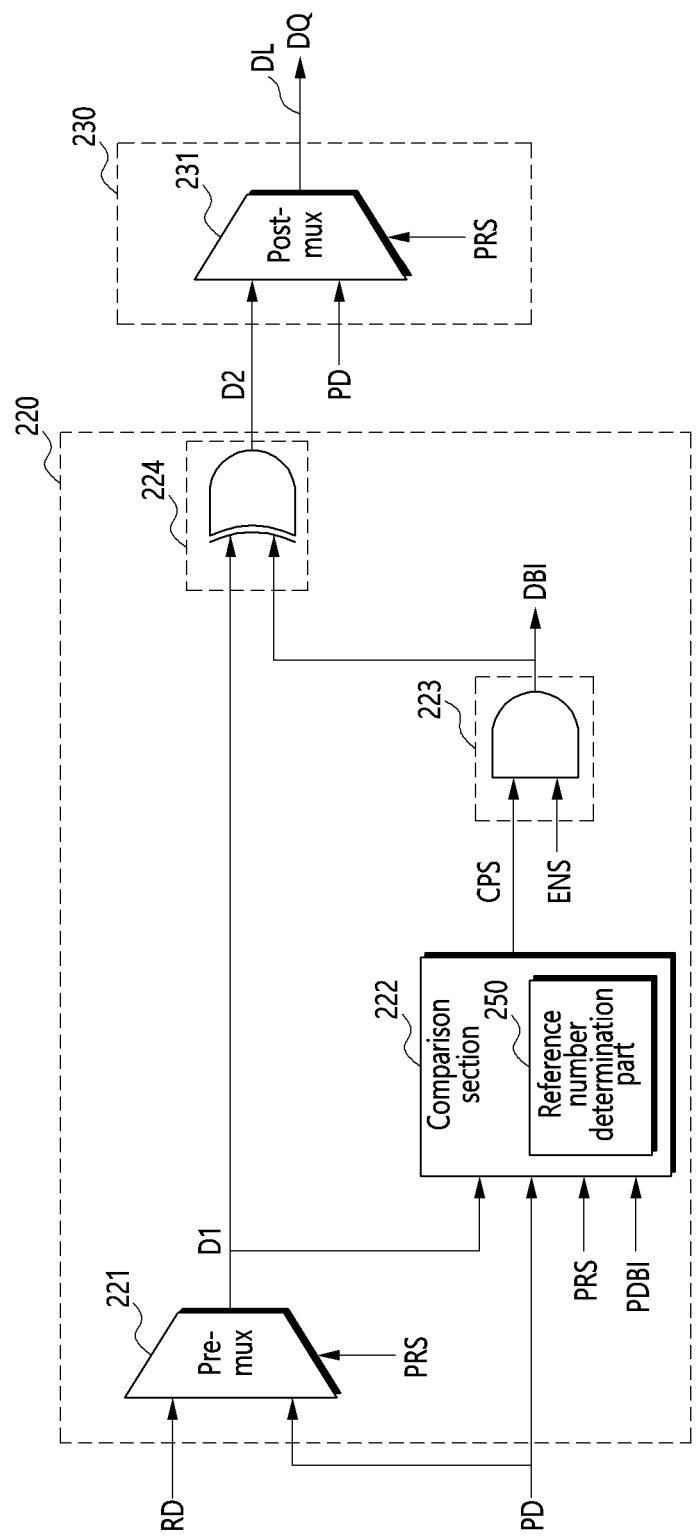
FIG. 3 is a circuit diagram illustrating in detail a first processing component and a second processing component of FIG. 2 in accordance with an embodiment of the present disclosure.

FIG. 3 is a circuit diagram illustrating in detail the first processing component 220 and the second processing component 230 of FIG. 2 in accordance with an embodiment of the present disclosure. In FIG. 3, a bandwidth of the data line DL is, for example, 8 bits. Accordingly, each of the read data RD, the previous data PD and the data DQ may be configured by 8 bits. Before the data DQ is outputted, the controller 110 may provide information on unnecessary bits (e.g., positions and/or the number of the unnecessary bits) in the 8-bit data DQ, as the partial read information PRI of FIG. 1 to the memory device 120. As shown in FIG. 1, the peripheral circuit 122 of the memory device 120 may generate the partial read signal PRS based on the partial read information PRI, and may provide the generated partial read signal PRS to the DBI circuit 123.

The first processing component 220 may include a pre-multiplexer (hereinafter pre-mux) 221, a comparison section 222, a DBI signal generation section 223 and an inversion section 224.

The pre-mux 221 may receive the read data RD and the previous data PD, and may output the first combination data D1 in response to the partial read signal PRS. The partial read signal PRS may indicate information on unnecessary bits in the 8-bit data DQ. The pre-mux 221 may output the first combination data D1 by selecting bits of necessary bit positions in the read data RD and selecting bits of unnecessary bit positions in the previous data PD, in response to the partial read signal PRS. Therefore, the first combination data D1 may include the bits of the necessary bit positions of the read data RD and the bits of the unnecessary bit positions of the previous data PD, as bits of the same positions.

The comparison section 222 may receive the first combination data D1 outputted from the pre-mux 221, the previous data PD, the previous DBI signal PDBI and the partial read signal PRS, and may output a comparison signal CPS.

The comparison section 222 may include a reference number determination part 250. The reference number determination part 250 may determine the reference number corresponding to the number of unnecessary bits in the data DQ, based on the partial read signal PRS. For example, the reference number determination part 250 may determine, as the reference number, a maximum integer that does not exceed a value obtained by dividing the number of necessary bits in the data DQ by a set number (e.g., 2). For example, the reference number determination part 250 may determine the reference number corresponding to the number of unnecessary bits in the data DQ, by referring to a predetermined table. The reference number may be any integer among 0 to a value, obtained by dividing a width (e.g., 8) of the data line DL by a set number (e.g., 2), accordingly, 4 (=8/2) herein, depending on the number of unnecessary bits in the data DQ.

The comparison section 222 may bitwise compare the first combination data D1 and the previous data PD, and thereby, may determine the number of bits in the first combination data D1 which are different from those in the previous data PD, as the number of transitions. The comparison section 222 may compare the number of transitions and the reference number.

When the number of transitions exceeds the reference number, the comparison section 222 may output the comparison signal CPS in an enable state. The fact that the number of transitions exceeds the reference number may mean that the number of transitions is a majority of the number of necessary bits in the data DQ.

When the number of transitions is less than the reference number, the comparison section 222 may output the comparison signal CPS in a disable state.

When the number of transitions is the same as the reference number, the comparison section 222 may operate differently depending on whether the number of necessary bits in the data DQ is odd or even. In detail, when the number of transitions is the same as the reference number and the number of necessary bits in the data DQ is odd, the comparison section 222 may output the comparison signal CPS in a disable state.

In a situation in which the number of transitions is the same as the reference number and the number of necessary bits in the data DQ is even, the comparison section 222 may output the comparison signal CPS in an enable state when the previous DBI signal PDBI is in an enable state, and may output the comparison signal CPS in a disable state when the previous DBI signal PDBI is in a disable state. In other words, the fact that the number of transitions is the same as the reference number in a situation in which the number of necessary bits in the data DQ is even means that the number of transitions is half the number of necessary bits in the data DQ. Thus, the comparison section 222 may determine a most efficient transmission state by additionally considering even a case of transitioning the DBI signal DBI.

The DBI signal generation section 223 may receive the comparison signal CPS outputted from the comparison section 222 and the DBI enable signal ENS, and may output the DBI signal DBI. The DBI signal generation section 223 may output the comparison signal CPS as the DBI signal DBI in response to the DBI enable signal ENS. In detail, when the DBI enable signal ENS is in a disable state, for example, 0, the DBI signal generation section 223 may output the DBI signal DBI in a disable state regardless of the comparison signal CPS. When the DBI enable signal ENS is in an enable state, for example, 1, the DBI signal generation section 223 may output the comparison signal CPS as the DBI signal DBI. Although not limited hereto, according to an embodiment, the DBI signal generation section 223 may be configured by an AND gate.

The inversion section 224 may receive the first combination data D1 outputted from the pre-mux 221 and the DBI signal DBI outputted from the DBI signal generation section 223, and may output the second combination data D2. The inversion section 224 may output the second combination data D2 by selectively inverting the first combination data D1 in response to the DBI signal DBI. In detail, when the DBI signal DBI is in an enable state, for example, 1, the inversion section 224 may output data, obtained by inverting the first combination data D1, as the second combination data D2. When the DBI signal DBI is in a disable state, for example, 0, the inversion section 224 may output the first combination data D1 as the second combination data D2 as it is. Although not limited hereto, according to an embodiment, the inversion section 224 may be configured by an exclusive OR (XOR) gate.

The second processing component 230 may include a post-multiplexer (hereinafter post-mux) 231. The post-mux 231 may operate similarly to the pre-mux 221 except that the post-mux 231 receives the second combination data D2 instead of the read data RD and outputs the data DQ instead of the first combination data D1. Namely, the post-mux 231 may output the data DQ by selecting bits of necessary bit positions in the second combination data D2 and selecting bits of unnecessary bit positions in the previous data PD, based on the partial read signal PRS.

FIG. 4 is a table showing the reference number depending on unnecessary bits in the data DQ, the first combination data D1 and the data DQ in accordance with an embodiment of the present disclosure. In some embodiments, FIG. 4 shows the reference number determined depending on unnecessary bits (or necessary bits) among a total 8 bits of the data DQ, and the first combination data D1 and the data DQ respectively generated according to the operation of the DBI circuit 123. A first case 401 may be a situation in which the controller 110 requires all of the total 8 bits of the data DQ, that is, the number of necessary bits is 8 bits and there is none of unnecessary bits. A last case 402 may be a situation in which the controller 110 requires none of the total 8 bits of the data DQ, that is, the number of unnecessary bits is 8 bits and there is none of necessary bits.

The reference number may be a maximum integer that does not exceed a value obtained by dividing the number of necessary bits in the data DQ by a set number (e.g., 2). The first combination data D1 may be configured by bits of unnecessary bit positions in the previous data PD and bits of necessary bit positions in the read data RD. The second combination data D2 may be data the same as the first combination data D1 or data obtained by inverting the first combination data D1, depending on a determination of the comparison section 222. The data DQ may be configured by the bits of the unnecessary bit positions in the previous data PD and bits of necessary bit positions in the second combination data D2.

In summary, the post-mux 231 of the second processing component 230 may output unnecessary bits in the data DQ to be the same as those in the previous data PD. Therefore, power consumption due to the output of the unnecessary bits in the data DQ may be minimized.

Also, the pre-mux 221 may output the unnecessary bits in the first combination data D1 to be the same as those in the previous data PD, and as a result, the number of transitions between the first combination data D1 and the previous data PD may be determined at only necessary bit positions. As a result, whether to perform inversion may be appropriately determined, and thus, transition in the data line DL may be minimized.

In order to further describe the operation and effect of the disclosure, a specific example summarized as in the following Table 1 may be observed. In the following example, among total 8 bits of the data DQ, unnecessary bits are LSB 4 bits and necessary bits are MSB 4 bits. In this case, the reference number may be 2.

TABLE 1

| | |
|---|---|
| RD | 00010011 |
| PD | 11111111 |
| D1 | 00011111 |
| D2 | 11100000 |
| DQ | 11101111 |

In the example of Table 1, the number of transitions between the read data RD and the previous data PD is 5. Therefore, it may be inefficient in terms of power consumption and operation speed to output the read data RD as it is to the controller 110 after outputting the previous data PD. In the case of simply outputting data obtained by inverting the read data RD, the number of transitions between the inverted data of the read data RD and the previous data PD may be reduced to 3. However, when considering that the lower 4 bits of the data DQ including the LSB (hereinafter LSB 4 bits) are unnecessary bits, such simple inversion may not maximize the efficiency.

According to the present disclosure, as in the example of Table 1, the first combination data D1 may be generated in the manner described above, and the comparison section 222 may determine the number of transitions between the first combination data D1 and the previous data PD as 3. Since the number of transitions exceeds the reference number of 2, the comparison section 222 may output the comparison signal CPS in an enable state. When the DBI enable signal ENS is in an enable state, the DBI signal generation section 223 may output the DBI signal DBI of an enable state in response to the comparison signal CPS of an enable state. As a result, the inversion section 224 may generate data, obtained by inverting the first combination data D1, as the second combination data D2 in response to the DBI signal DBI of an enable state. The post-mux 231 may generate the data DQ by selecting necessary bit positions, that is, the upper 4 bits including MSB (hereinafter MSB 4 bits), in the second combination data D2 and selecting unnecessary bit positions, that is, the LSB 4 bits, in the previous data PD. As a result, since the number of transitions between the previous data PD and the data DQ is 1, the number of transitions may be effectively reduced compared to the initial number of transitions of 5.

In order to further describe the operation and effect of the present disclosure, specific examples summarized as in the following Table 2 and Table 3 may be observed. In the following examples unnecessary bits are LSB 4 bits and necessary bits are MSB 4 bits among a total 8 bits of the data DQ. In this case, the reference number may be 2. The difference between Table 2 and Table 3 is that in Table 2, the previous DBI signal PDBI is an enable state (i.e., 1) but in Table 3, the previous DBI signal PDBI is in a disable state (i.e., 0).

TABLE 2

| | |
|---|---|
| RD | 00110001 |
| PD, PDBI | 11111111, 1 |
| D1 | 00111111 |
| D2 | 11000000 |
| DQ, DBI | 11001111, 1 |

TABLE 3

| | |
|---|---|
| RD | 00110001 |
| PD, PDBI | 11111111, 0 |
| D1 | 00111111 |
| D2 | 00111111 |
| DQ, DBI | 00111111, 0 |

According to the present disclosure, as in the examples of Table 2 and Table 3, the first combination data D1 may be generated in the manner described above, and the comparison section 222 may determine the number of transitions between the first combination data D1 and the previous data PD as 2. Namely, the examples of Table 2 and Table 3 may correspond to a case where, when the number of necessary bits in the data DQ is even, the number of transitions is the same as the reference number. That is, the number of transitions may be half the number of necessary bits in the data DQ. Therefore, the comparison section 222 may additionally consider a case of transitioning the DBI signal DBI.

In detail, referring to Table 2, in a situation in which the number of necessary bits in the data DQ is even and the number of transitions is the same as the reference number, the comparison section 222 may output the comparison signal CPS in an enable state when the previous DBI signal PDBI is in an enable state. As a result, the DBI signal DBI may also be outputted in an enable state, and data obtained by inverting the first combination data D1 may be generated as the second combination data D2. When the data DQ is generated according to the above-described method, the number of transitions between the previous data PD and the previous DBI signal PDBI and the data DQ and the DBI signal DBI may be 2 as a result. In summary, the number of transitions may be minimized by maintaining the DBI signal DBI in an enable state to be the same as the previous DBI signal PDBI.

Referring to Table 3, in a situation in which the number of necessary bits in the data DQ is even and the number of transitions is the same as the reference number, the comparison section 222 may output the comparison signal CPS in a disable state when the previous DBI signal PDBI is in a disable state. As a result, the DBI signal DBI may also be outputted in a disable state, and the first combination data D1 may be generated as the second combination data D2. When the data DQ is generated according to the above-described method, the number of transitions between the previous data PD and the previous DBI signal PDBI and the data DQ and the DBI signal DBI may be 2 as a result. In summary, the number of transitions may be minimized by maintaining the DBI signal DBI in a disable state to be same as the previous DBI signal PDBI.

In a situation where, as described above, the number of necessary bits in the data DQ is even and the number of transitions is the same as the reference number, when, unlike the examples of Table 2 and Table 3, the DBI signal DBI is outputted not to be the same as the previous DBI signal PDBI, the number of transitions will not be minimized since the DBI signal DBI needs to be transitioned. In summary, according to the disclosure, operation efficiency may be maximized by minimizing the number of transitions depending on the number of necessary bits in the data DQ.

Unlike the above-described examples, unnecessary bits in the data DQ may be lopsided in an MSB direction. Moreover, unnecessary bits in the data DQ may not be continuous and may be separated from each other, for example, odd-numbered bits or even-numbered bits. That is, the disclosure may not be limited to specific unnecessary bit positions and may be applied the same to various bit positions.

Depending on an embodiment, the controller 110 may provide the partial read information PRI to the memory device 120 in various ways. For example, when, as shown in FIG. 4, there are a total 9 cases depending on which bits are unnecessary in the data DQ, the controller 110 may provide the partial read information PRI by setting partial read mode registers of 4 bits included in the peripheral circuit 122. As another example, when transmitting a read command for the data DQ, the controller 110 may provide the partial read information PRI by including the partial read information PRI in a reserved portion or a don't care portion of the read command. As still another example, the controller 110 may provide the partial read information PRI through separate pins which are connected to the memory device 120.

Figure 5:
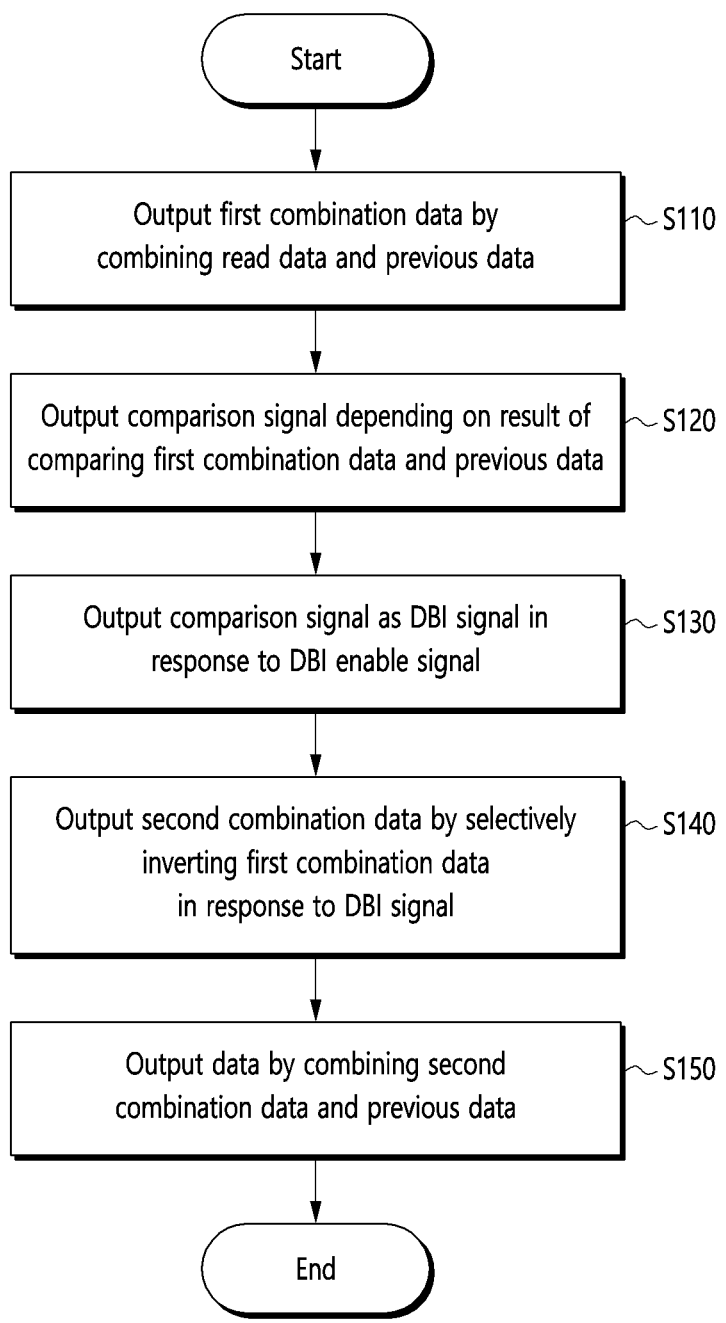
FIG. 5 is a flowchart illustrating a method for operating the first processing component and the second processing component of the DBI circuit of FIG. 3 in accordance with an embodiment of the present disclosure.

FIG. 5 is a flowchart illustrating a method for operating the first processing component 220 and the second processing component 230 of the DBI circuit 123 of FIG. 3 in accordance with an embodiment of the disclosure.

Referring to FIG. 5, at operation S110, the pre-mux 221 may output the first combination data D1 by combining the read data RD and the previous data PD. The first combination data D1 may include bits of necessary bit positions of the read data RD and bits of unnecessary bit positions of the previous data PD, as bits of the same positions.

At operation S120, the comparison section 222 may output the comparison signal CPS depending on a result of comparing the first combination data D1 and the previous data PD.

At operation S130, the DBI signal generation section 223 may output the comparison signal CPS as the DBI signal DBI in response to the DBI enable signal ENS. When the DBI enable signal ENS is in a disable state, the DBI signal generation section 223 may output the DBI signal DBI in a disable state regardless of the comparison signal CPS. When the DBI enable signal ENS is in an enable state, the DBI signal generation section 223 may output the comparison signal CPS as the DBI signal DBI.

At operation S140, the inversion section 224 may output the second combination data D2 by selectively inverting the first combination data D1 in response to the DBI signal DBI. When the DBI signal DBI is in an enable state, the inversion section 224 may output data, obtained by inverting the first combination data D1, as the second combination data D2. When the DBI signal DBI is in a disable state, the inversion section 224 may output the first combination data D1 as the second combination data D2.

At operation S150, the second processing component 230 may output the data DQ by combining the second combination data D2 and the previous data PD. The data DQ may include bits of necessary bit positions of the second combination data D2 and bits of unnecessary bit positions of the previous data PD, as bits of the same positions.

Figure 6:
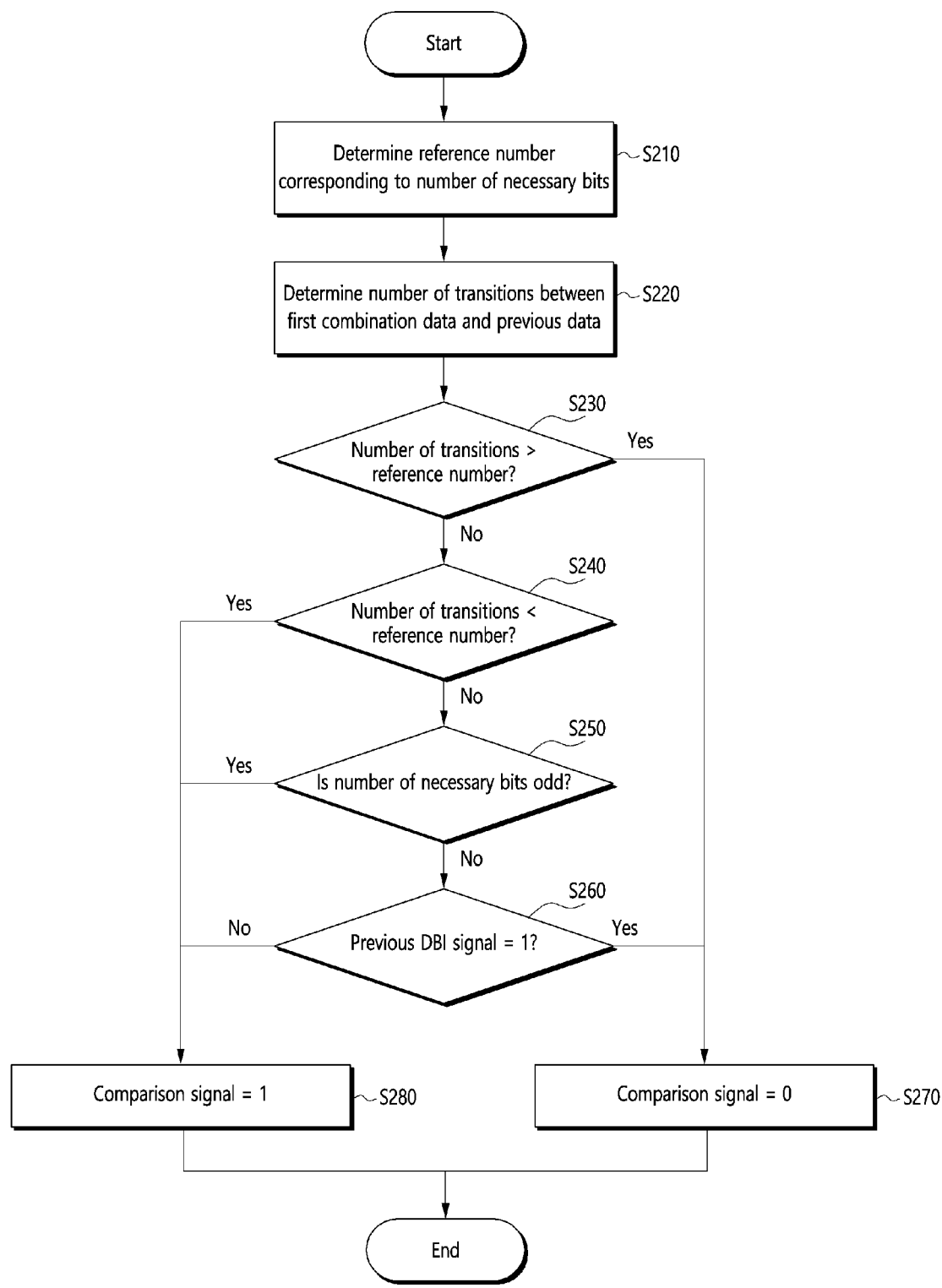
FIG. 6 is a flowchart illustrating a method for operating a comparison section of FIG. 3 in accordance with an embodiment of the present disclosure.

FIG. 6 is a flowchart illustrating a method for operating the comparison section 222 of FIG. 3 in accordance with an embodiment of the disclosure. The operating method shown in FIG. 6 may be a detailed example of the operation S120 of FIG. 5.

At operation S210, the reference number determination part 250 of the comparison section 222 may determine the reference number corresponding to the number of necessary bits in the data DQ, based on the partial read signal PRS.

At operation S220, the comparison section 222 may determine the number of transitions between the first combination data D1 and the previous data PD.

At operation S230, the comparison section 222 may determine whether the number of transitions exceeds the reference number. When it is determined that the number of transitions exceeds the reference number (S230, Yes), the process may proceed to operation S270. When it is determined that the number of transitions does not exceed the reference number (S230, No), the process may proceed to operation S240.

At the operation S240, the comparison section 222 may determine whether the number of transitions is less than the reference number. When it is determined that the number of transitions is less than the reference number (S240, Yes), the process may proceed to operation S280. When it is determined that the number of transitions is the same as the reference number (S240, No), the process may proceed to operation S250.

At the operation S250, the comparison section 222 may determine whether the number of necessary bits in the data DQ is odd, based on the partial read signal PRS. When it is determined that the number of necessary bits in the data DQ is odd (S250, Yes), the process may proceed to the operation S280. When it is determined that the number of necessary bits in the data DQ is even (S250, No), the process may proceed to operation S260.

At the operation S260, the comparison section 222 may determine whether the previous DBI signal PDBI is in an enable state (e.g., 1). When it is determined that the previous DBI signal PDBI is in an enable state (S260, Yes), the process may proceed to the operation S270. When it is determined that the previous DBI signal PDBI is in a disable state (S260, No), the process may proceed to the operation S280.

At the operation S270, the comparison section 222 may output the comparison signal CPS in an enable state (e.g., 1).

At the operation S280, the comparison section 222 may output the comparison signal CPS in a disable state (e.g., 0).

While various embodiments have been described above, it will be understood to those skilled in the art that the embodiments described are examples only. Accordingly, the DBI circuit and the memory device including the same described herein should not be limited based on the described embodiments.

Moreover, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

What is claimed is:

1. A data bus inversion (DBI) circuit of a memory device, comprising:
    a first processing circuit configured to generate first combination data by combining read data read from a memory cell region and previous data previously outputted from a data line, and generate second combination data by selectively inverting the first combination data depending on a result of comparing the first combination data and the previous data; and
    a second processing circuit configured to generate data to be outputted from the data line, by combining the second combination data and the previous data,
    wherein the second processing circuit generates bits of unnecessary bit positions in the data to be the same as bits of the unnecessary bit positions in the previous data,
    wherein the first processing circuit determines a reference number corresponding to the number of necessary bits in the data, determines the number of transitions by comparing the first combination data with the previous data, and generates the second combination data by selectively inverting the first combination data based on the number of transitions and the reference number.

2. The DBI circuit according to claim 1, wherein the second processing circuit generates bits of necessary bit positions in the data to be the same as bits of the necessary bit positions in the second combination data.

3. The DBI circuit according to claim 1, wherein the second processing circuit identifies the unnecessary bit positions based on a partial read signal.

4. The DBI circuit according to claim 1, wherein the first processing circuit generates bits of the unnecessary bit positions in the first combination data to be the same as the bits of the unnecessary bit positions in the previous data.

5. The DBI circuit according to claim 1, wherein the first processing circuit generates bits of necessary bit positions in the first combination data to be the same as bits of the necessary bit positions in the read data.

6. The DBI circuit according to claim 1, wherein the first processing circuit generates inverted first combination data as the second combination data when the number of transitions exceeds the reference number.

7. The DBI circuit according to claim 1, wherein the first processing circuit generates the first combination data as the second combination data when the number of transitions is less than the reference number.

8. The DBI circuit according to claim 1, wherein the first processing circuit generates the first combination data as the second combination data when the number of transitions is the same as the reference number and the number of the necessary bits is odd.

9. The DBI circuit according to claim 1, wherein the first processing circuit generates inverted first combination data as the second combination data when the number of transitions is the same as the reference number, the number of the necessary bits is even, and a previous DBI signal is in an enable state.

10. The DBI circuit according to claim 1, wherein the first processing circuit generates the first combination data as the second combination data when the number of transitions is the same as the reference number, the number of the necessary bits is even, and the previous DBI signal is in a disable state.

11. The DBI circuit according to claim 1, wherein the reference number is a maximum integer that does not exceed a value obtained by dividing the number of the necessary bits by a set number.

12. The DBI circuit according to claim 1, wherein the first processing circuit comprises:
    a pre-multiplexer configured to generate the first combination data by combining the read data and the previous data;

a comparison circuit configured to determine the number of transitions by comparing the first combination data with the previous data, and output a comparison signal depending on a result of comparing the number of transitions with a reference number;

a DBI signal generation circuit configured to output the comparison signal as a DBI signal in response to a DBI enable signal; and an inversion circuit configured to output the second combination data by inverting the first combination data in response to the DBI signal.

13. A data bus inversion (DBI) circuit of a memory device, comprising:

a first processing circuit configured to generate first combination data by combining read data read from a memory cell region and previous data previously outputted from a data line, and generate second combination data by selectively inverting the first combination data depending on a result of comparing the first combination data with the previous data; and a second processing circuit configured to generate data to be outputted from the data line, by combining the second combination data and the previous data, wherein the first processing circuit generates bits of unnecessary bit positions in the first combination data to be the same as bits of the unnecessary bit positions in the previous data, wherein the first processing circuit determines a reference number corresponding to the number of necessary bits in the data, determines the number of transitions by comparing the first combination data with the previous data, and generates the second combination data by selectively inverting the first combination data based on the number of transitions and the reference number.

14. The DBI circuit according to claim 13, wherein the first processing circuit generates bits of necessary bit positions in the first combination data to be the same as bits of the necessary bit positions in the read data.

15. The DBI circuit according to claim 13, wherein the second processing circuit generates bits of the unnecessary bit positions in the data to be the same as the bits of the unnecessary bit positions in the previous data.

16. The DBI circuit according to claim 13, wherein the second processing circuit generates bits of necessary bit positions in the data to be the same as bits of the necessary bit positions in the second combination data.

17. The DBI circuit according to claim 13, wherein the first processing circuit identifies the unnecessary bit positions based on a partial read signal.

18. The DBI circuit according to claim 13, wherein the first processing circuit generates inverted first combination data as the second combination data when the number of transitions exceeds the reference number.

19. The DBI circuit according to claim 13, wherein the first processing circuit generates the first combination data as the second combination data when the number of transitions is less than the reference number.

20. The DBI circuit according to claim 13, wherein the first processing circuit generates the first combination data as the second combination data when the number of transitions is the same as the reference number and the number of the necessary bits is odd.

21. The DBI circuit according to claim 13, wherein the first processing circuit generates inverted first combination data as the second combination data when the number of transitions is the same as the reference number, the number of the necessary bits is even, and a previous DBI signal is in an enable state.

22. The DBI circuit according to claim 13, wherein the first processing circuit generates the first combination data as the second combination data when the number of transitions is the same as the reference number, the number of the necessary bits is even, and the previous DBI signal is in a disable state.

23. The DBI circuit according to claim 13, wherein the reference number is a maximum integer that does not exceed a value obtained by dividing the number of the necessary bits by a set number.

24. The DBI circuit according to claim 13, wherein the first processing circuit comprises:

a pre-multiplexer configured to generate the first combination data by combining the read data and the previous data;

a comparison circuit configured to determine the number of transitions by comparing the first combination data with the previous data, and output a comparison signal depending on a result of comparing the number of transitions with a reference number;

a DBI signal generation circuit configured to output the comparison signal as a DBI signal in response to a DBI enable signal; and an inversion circuit configured to output the second combination data by inverting the first combination data in response to the DBI signal.

25. A data bus inversion (DBI) circuit of a memory device, comprising:

a first processing circuit configured to generate first combination data by combining read data read from a memory cell region and previous data previously outputted from a data line, determine a reference number based on a partial read signal, and generate second combination data by inverting the first combination data depending on a result of comparing the number of transitions between the first combination data and the previous data with the reference number; and a second processing circuit configured to generate data to be outputted from the data line, by combining the second combination data and the previous data, wherein the first processing circuit determines the reference number corresponding to the number of necessary bits in the data, determines the number of transitions by comparing the first combination data with the previous data, and generates the second combination data by selectively inverting the first combination data based on the number of transitions and the reference number.

26. The DBI circuit according to claim 25, wherein the second processing circuit generates bits of unnecessary bit positions in the data to be the same as bits of the unnecessary bit positions in the previous data.

27. The DBI circuit according to claim 25, wherein the second processing circuit generates bits of necessary bit positions in the data to be the same as bits of the necessary bit positions in the second combination data.

28. The DBI circuit according to claim 25, wherein the first processing circuit generates bits of unnecessary bit positions in the first combination data to be the same as the bits of the unnecessary bit positions in the previous data.

29. The DBI circuit according to claim 25, wherein the first processing circuit generates bits of necessary bit positions in the first combination data to be the same as bits of the necessary bit positions in the read data.

30. The DBI circuit according to claim 25, wherein the reference number is a maximum integer that does not exceed a value obtained by dividing the number of the necessary bits in the data by a set number.

31. The DBI circuit according to claim 25, wherein the first processing circuit generates inverted first combination data as the second combination data when the number of transitions exceeds the reference number.

32. The DBI circuit according to claim 25, wherein the first processing circuit generates the first combination data as the second combination data when the number of transitions is less than the reference number.

33. The DBI circuit according to claim 25, wherein the first processing circuit generates the first combination data as the second combination data when the number of transitions is the same as the reference number and the number of the necessary bits in the data is odd.

34. The DBI circuit according to claim 25, wherein the first processing circuit generates inverted first combination data as the second combination data when the number of transitions is the same as the reference number, the number of the necessary bits in the data is even, and a previous DBI signal is in an enable state.

35. The DBI circuit according to claim 25, wherein the first processing circuit generates the first combination data as the second combination data when the number of transitions is the same as the reference number, the number of the necessary bits in the data is even, and the previous DBI signal is in a disable state.

36. The DBI circuit according to claim 25, wherein the first processing circuit comprises:
a pre-multiplexer configured to generate the first combination data by combining the read data and the previous data;
a comparison circuit configured to determine the reference number, determine the number of transitions by comparing the first combination data with the previous data, and output a comparison signal depending on a result of comparing the number of transitions with the reference number;
a DBI signal generation circuit configured to output the comparison signal as a DBI signal in response to a DBI enable signal; and
an inversion circuit configured to output the second combination data by inverting the first combination data in response to the DBI signal.

37. A memory device comprising:
a memory cell region;
a data bus inversion (DBI) circuit configured to generate data to be outputted to a controller through a data line, based on read data read from the memory cell region; and
a peripheral circuit configured to transmit a partial read signal, indicating unnecessary bit positions in the data, to the DBI circuit based on partial read information received from the controller,
wherein the DBI circuit comprises:
a first processing circuit configured to generate first combination data by combining the read data and previous data, previously outputted to the controller through the data line, based on the partial read signal, and generate second combination data by selectively inverting the first combination data depending on a result of comparing the first combination data with the previous data; and
a second processing circuit configured to generate the data by combining the second combination data and the previous data based on the partial read signal,
wherein the first processing circuit determines a reference number corresponding to the number of necessary bits in the data, determines the number of transitions by comparing the first combination data with the previous data, and generates the second combination data by selectively inverting the first combination data based on the number of transitions and the reference number.

* * * * *